(12) United States Patent
Parker et al.

(10) Patent No.: US 8,046,443 B2
(45) Date of Patent: Oct. 25, 2011

(54) RAPID DEPLOYMENT REMOTE NETWORK MONITOR

(75) Inventors: David Parker, Redwood City, CA (US); Anirudha S. Karandikar, Cary, NC (US); Luke Meyer, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 259 days.

(21) Appl. No.: 12/196,190

(22) Filed: Aug. 21, 2008

(65) Prior Publication Data
US 2010/0049839 A1 Feb. 25, 2010

(51) Int. Cl.
*G06F 15/177* (2006.01)
(52) U.S. Cl. ........ 709/220; 709/203; 709/217; 709/223; 709/224
(58) Field of Classification Search .................. 709/202, 709/217, 220, 223, 224
See application file for complete search history.

(56) References Cited

U.S. PATENT DOCUMENTS

| | | | | |
|---|---|---|---|---|
| 6,370,573 | B1 * | 4/2002 | Bowman-Amuah | 709/223 |
| 7,543,048 | B2 * | 6/2009 | Rothman et al. | 709/222 |
| 2002/0124245 | A1 * | 9/2002 | Maddux et al. | 717/176 |
| 2003/0131078 | A1 * | 7/2003 | Scheer et al. | 709/220 |
| 2003/0208523 | A1 * | 11/2003 | Gopalan et al. | 709/201 |
| 2004/0024876 | A1 * | 2/2004 | Ito et al. | 709/226 |
| 2005/0108383 | A1 * | 5/2005 | DeHaas et al. | 709/224 |
| 2005/0149729 | A1 * | 7/2005 | Zimmer et al. | 713/168 |
| 2006/0031083 | A1 * | 2/2006 | Dalal et al. | 705/1 |
| 2007/0124451 | A1 * | 5/2007 | Joshi et al. | 709/223 |
| 2008/0046546 | A1 * | 2/2008 | Parmar et al. | 709/220 |
| 2008/0046581 | A1 * | 2/2008 | Molina et al. | 709/229 |
| 2008/0184218 | A1 * | 7/2008 | Largman et al. | 717/168 |

OTHER PUBLICATIONS

Red Hat Command Center 3.18, Check Reference, Red Hat, Inc., 2007, 178 pages.
Red Hat Command Center, Users Guide 3.18, Red Hat, Inc., 2007, 318 pages.
Red Hat Command Center, Release Notes 3.18, Red Hat, Inc., 2007, 7 pages.
Red Hat Command Center 3.18, Setup and Installation Guide, Red Hat, Inc., 2007, 33 pages.

* cited by examiner

*Primary Examiner* — Phuoc Nguyen
(74) *Attorney, Agent, or Firm* — Lowenstein Sandler PC (57) ABSTRACT

A method and apparatus for imaging a network monitor. In one embodiment, the method includes receiving information concerning a customer network to be monitored by a network monitor, and selecting a bootable image for the network monitor using the network information. The bootable image contains network monitoring software and an operating system, and can be booted on any computing device of the customer network. The method further includes providing the bootable image of the network monitor to a requester, and then receiving a fixed IP address of the network monitor from a computing device on the customer network that is designated to host the network monitor.

25 Claims, 8 Drawing Sheets

RAPID DEPLOYMENT REMOTE NETWORK MONITOR

TECHNICAL FIELD

Embodiments of the present invention relate to monitoring of networks, and more specifically to providing a bootable image of a network monitor.

BACKGROUND

Networked computers are used to transmit and fetch information to and from local sources (e.g., computers used in a business) and remote sources (e.g., enterprise services offered over the Internet). To ensure privacy and security during communication between networked computers, authentication and verification mechanisms may be used. Thus, the authentication and verification mechanisms can be used to establish a trusted session between a server and client. The trusted session can be used to transfer communications for monitoring and managing network monitors so that security and privacy for each user can be maintained.

A network monitor is typically arranged to act as an intermediary between a host network and a system that is used to manage the host network. The network monitor receives monitoring information from hosts on a network and sends the received monitoring information to a service provider server in the system. The received information is processed through the network monitor, which passes the processed information to the service provider server. The service provider server typically stores information for monitored local URLs, hosts (monitored servers and/or applications), and checks (specific information gathered from a host). The service provider server also can generate notifications, log all monitoring events, and communicate with service provider daemons executing on monitored hosts.

A network monitor uses a trusted session to provide information for managing a network to system administrators at a service provider server. For example, administrators from a service company can manage an in-house system for a client company by using networking configuration software over a public network. The conventional network monitor allows monitoring of behind-the-firewall network infrastructure without the need to open incoming network ports. The conventional network monitor is a hardware device that is typically pre-configured. The network monitor is typically configured with no listening ports activated so that external intrusion attempts are avoided. Network communications from the network monitor to the systems to be monitored (host systems) and to the service provider server are normally one-way and initiated by the network monitor. The network monitor periodically collects monitoring data from the customer network environment and packages and sends the data to the configuration service provider server at regular intervals using a trusted session The network monitor can also request any updates for the configurations, and monitoring schedules during the session. The configuration service provider server can deliver any changes that the customer may have made via the trusted session portal, as well as provide updates such as new features or bug fixes available after a product release. However, the cost of dedicated hardware for network monitoring systems for maintenance of relatively small systems can be a significant portion of the cost for maintaining a system. In such cases, customers are normally required to pay the relatively high cost to maintain secure network monitoring or to forgo using a secure system for network monitoring.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for providing a software network monitor that can be installed on a random computing device of a customer network. In one embodiment, a customer receives a bootable image from a service provider server. The bootable image includes network monitoring software and an operating system, and can be installed on any computing device of the customer network. After the customer installs the network monitoring software on the computing device, the computing device authenticates itself to a service provider server to obtain a license key to activate the network monitoring software.

In another embodiment, a service provider server receives information about a customer network to be monitored by a network monitor, generates a bootable image for the network monitor using the network information, and provides the bootable image to a requestor. The bootable image includes network monitoring software and an operating system, and can be installed on any computing device of the customer network. The bootable image also contains instructions for the installation process, including instructions to request a fixed IP address of the network monitor when the bootable image is being installed on a computing device of the customer network that is designated to host the network monitor. Once the bootable image is installed on the designated computing device of the customer network, the designated computing device sends a fixed IP address of the network monitor to the service provider server to allow communication between the service provider server and the network monitor.

By providing a bootable image of a network monitor, a service provider server makes it significantly less expensive for prospective customers to try its monitoring services. In particular, a prospective customer no longer needs to pay for a physical computing device operating as a network monitor. Instead, a prospective customer can securely download a bootable image of the network monitor, and install it on any existing device of the customer's network.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium. The machine-readable storage medium may include read only memory ("ROM"), random access memory ("RAM"), magnetic disk storage media, optical storage media, flash memory devices, and the like. A machine readable transmission medium may be used to propagate electrical, optical, acoustical or other form of propagated signals such as carrier waves, infrared signals, digital signals and the like.

Unless specifically stated otherwise as apparent from the following discussion, it is appreciated that throughout the description, discussions utilizing terms such as "processing" or "generating" or "calculating" or "determining" or "selecting" or "transmitting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The description that follows details a system and method for installing a secure software network monitor. Installation of a rapidly deployed secure network monitor can be initiated by a user obtaining (e.g., securely downloading or by receiving a software carrier via mail) an image of the secure software network monitor. The user can reconfigure the host network firewall to allow communications with the web address of the service provider server so that a computing device designated to host the network monitor can communicate with the service provider server.

The received image is a bootable image (such as an ISO image) that the computing device uses to boot itself. The bootable image contains an operating system and the application software for network monitoring. The computing device boots from the boot image (which implements software networking monitoring functionality) and executes an installation routine. The installation routine may request, for example, the local, static IP address to be used for the secure network monitor, the local, static IP address(es) to be used for other secure network monitors to be installed, and a device name for each secure network monitor installed. Using the software network monitor allows users of networking systems to rapidly deploy a networking monitoring solution. The users can also avoid paying for a hardware solution (e.g., packaged and sold by a provider of the monitoring service) and yet be provided with an improved, robustly secure system for remote networking monitoring.

Figure 1A:
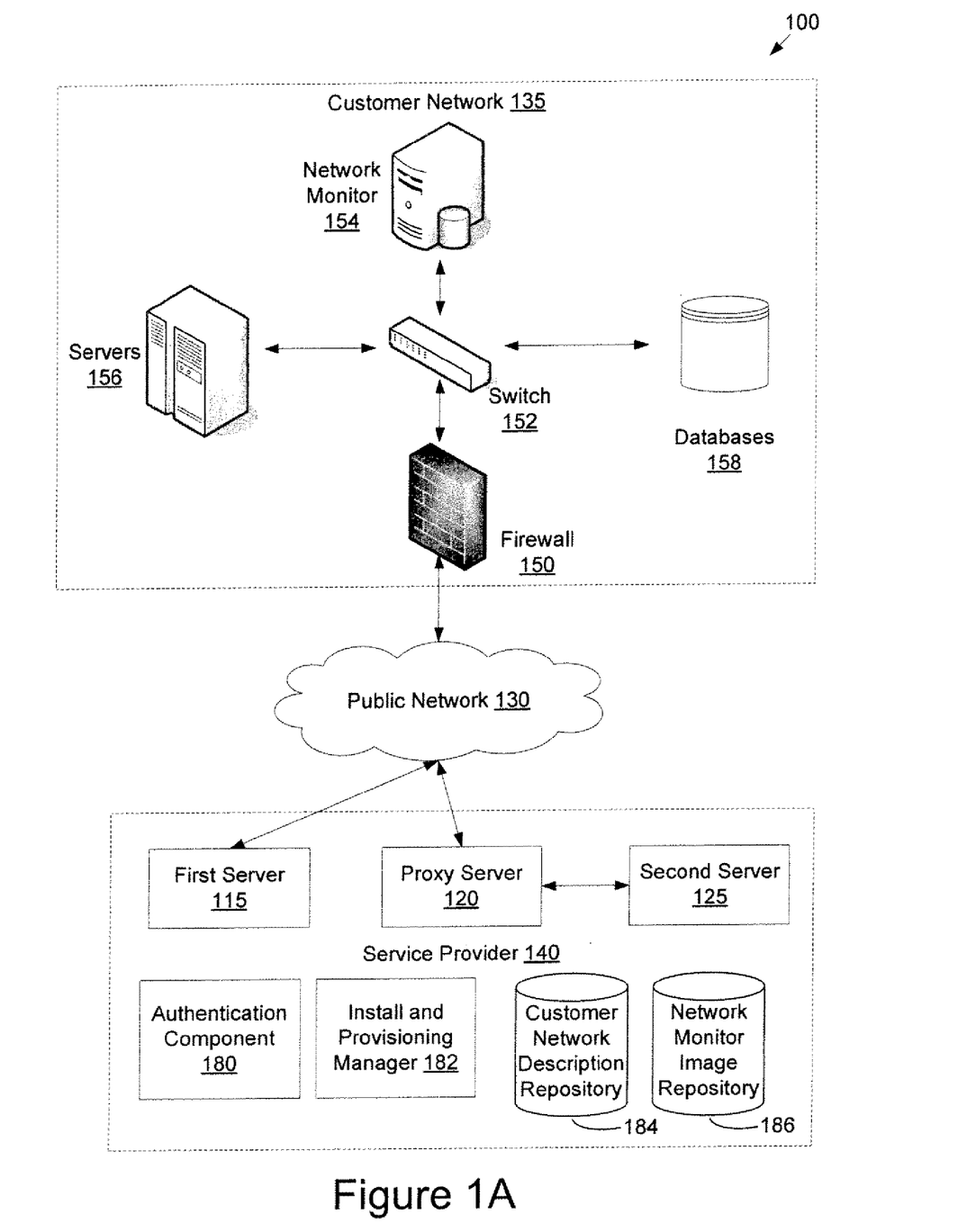
FIG. 1 illustrates an exemplary network architecture in which embodiments of the present invention may operate.
Figure 1B:
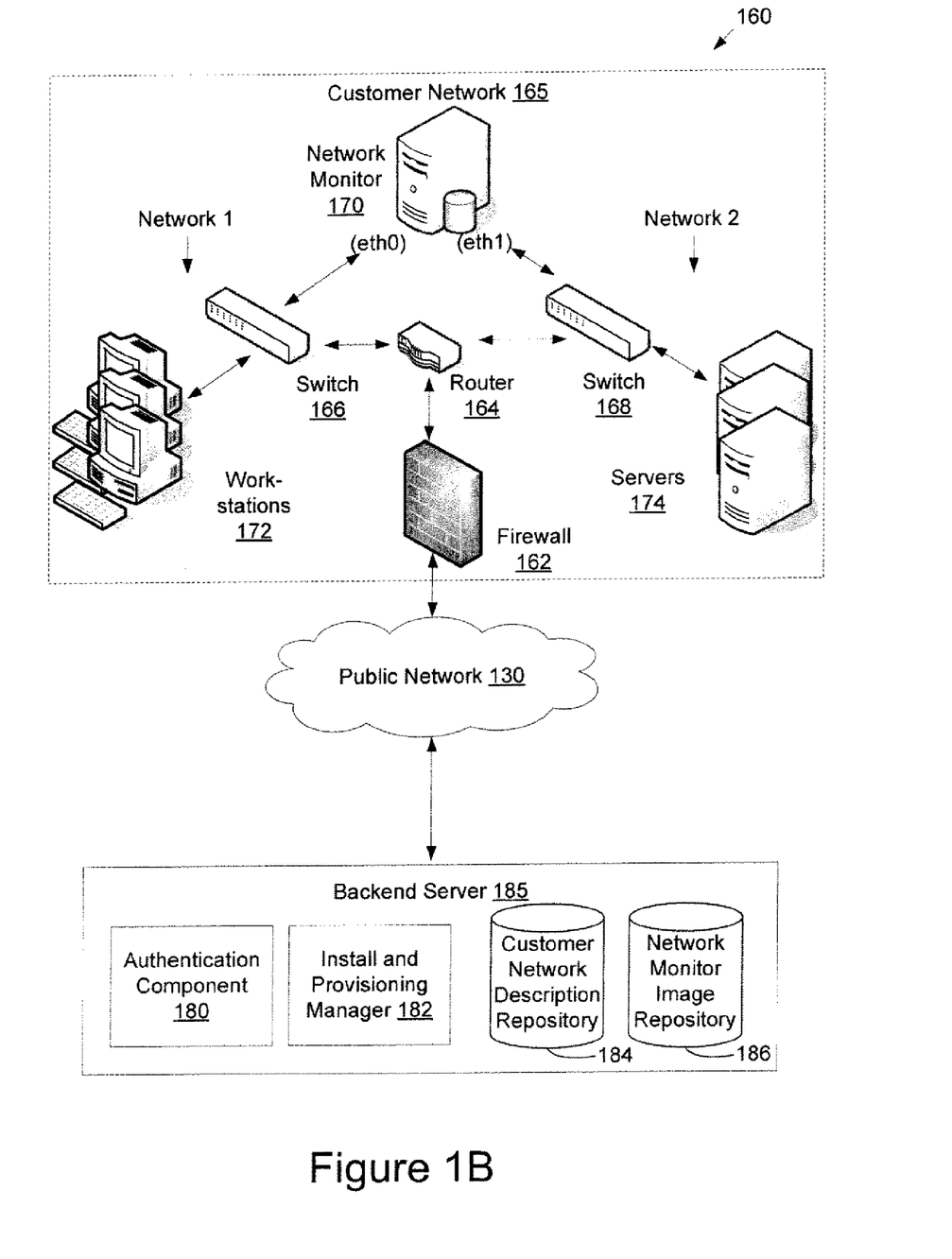

FIG. 1 illustrates an exemplary network architecture 100 in which embodiments of the present invention may operate. The network architecture 100 may include a service provider server 140 connected with a customer network 135. The customer network 135 can include, for example, a local area network (LAN) or a wide area network (WAN, such as an intranet) connected with the service provider server 140 over a public network 130 (e.g., the Internet). Alternatively, the customer network 135 may be connected with the service provider server 140 via a private network such as an intranet, virtual private network (VPN), and the like.

The customer network 135 may represent a network of an enterprise and may include such devices as desktop computers, laptop computers, network printers, switches, routers, gateways, firewalls, or any other devices having a network address. For example, the customer network 135 may include a firewall 150, a switch 152, a client device 120, servers 156, and databases 158.

Service provider server 140 provides monitoring services to customer network 135. Service provider server 140 may include a web application server (not shown) that provides a web application interface accessible to client 120 via a web browser. A user of the client device 120 may send a request for a network monitor image to the service provider server 140 via the web application interface. In response, the service provider server 140 may select a bootable image of a network monitor, and provide it to the client 120. The installation of the bootable image may then be initiated on a computing device of the customer network 135 that is designated as a network monitor (designated network monitor device 154).

Alternatively, a user of the designated device 154 may request a bootable image of the network monitor via a browser hosted by the designated device 154, and then install it on the designated device 154. The installation of the network monitor image can cause the existing operating system and any existing software and data to be overwritten with the operating system and software of the network monitor.

The designated network monitor device 154 can be placed in any location on the network in order to monitor any desired server(s) and/or application(s), whether for an entire network 135 or a single subnet. The designated device 154 typically is connected to the Internet via HTTPS and uses an established connection in order to send monitoring information to the service provider server 140 and receive configuration updates from the service provider server 140. In one embodiment, there are no other network requirements for the designated device 154.

The designated device 154 hosting the network monitor can be connected to the customer network 135 through a single interface (for example, using the device name "eth0" for the interface) and can access the public network 130 directly (through switch 152 and firewall 150). Alternatively, the designated device 154 can be connected to multiple customer networks using network address translation (NAT) by connecting a primary interface ("eth0") to network 1 and the secondary interface ("eth1") to network 2.

In one embodiment, once the bootable image is installed, service provider server 140 provisions the network monitor 154 by collecting information about the customer network 135 and devices on the customer network 135. The service provider server 140 then analyzes this information, and uses the information to manage daemons executing on customer network 135 devices and the network monitor 154. The service provider server 140 can also present the analysis to a user such as an IT administrator (e.g., via a local computing device or a web-based GUI accessible via client 120). The service provider server 140 may provide other services, such as website monitoring services, database management services, etc.

In one embodiment, the service provider server 140 has a service provider server that includes a monitor image generator 180, an install and provisioning manager 182, a customer network description depository 184, and a network monitor image repository 186. The service provider server may be hosted by a computing device such as, for example, a desktop computer, laptop computer, server, and the like.

In one embodiment, the install and provisioning manager 182 communicates with the client 120 or the network monitor installed on designated device 154 to uniquely identify and/or authenticate the client or network monitor. For example, the received bootable image used to install a network monitor can contain an embedded security certificate that can be used to authenticate the network monitor with the install and provisioning manager 182. When the network monitor has been authenticated, the install and provisioning manager can, for example, provide a license key to the network monitor to activate software in the network monitor.

In another embodiment, the monitor image generator 180 communicates with the client 120 or the designated device 154 to uniquely identify and/or authenticate a user account associated with the customer network 135 (e.g., using a username and password) and to receive a request for a network monitor image to be downloaded. Based on the received information, the monitor image generator 180 accesses network description information stored in the customer network description repository 184, and generates a customized bootable install image for the associated customer network. In particular, the monitor image generator 180 can use configuration information from the customer network description repository 184 to determine the type of machine code, feature set, drivers, and the like to produce an install image for the network monitor. In addition, the configuration information can be used to create a routine that ensures that each and every monitoring interface in the network description is configured properly, and to add data that specifies a level and type of service, types of (and frequency of) probes to used, length that probed data is to be maintained, payment information, and the like.

Network monitor image repository 186 can be used to store images for network monitors. For example, network monitor image repository 186 can be used to store a full image (or various parts of full images) of the network monitor for the customer network 135.

The install and provisioning manager 182 provides the network monitor image to the client 120 or designated device 154. This image is then installed on the designated device 154. Once the image is installed, the designated device 154 sends a static IP address of the network monitor to the install and provisioning manager 182, which establishes communication with the network monitor 154 and provisions the network monitor 154 to enable customer network monitoring.

After the network monitor image is installed on the designated device 154, the network monitor does not require maintenance or reconfiguration to perform routine monitoring. The network monitor may only need to be accessed for hardware improvements or, rarely, for troubleshooting.

Figure 2:
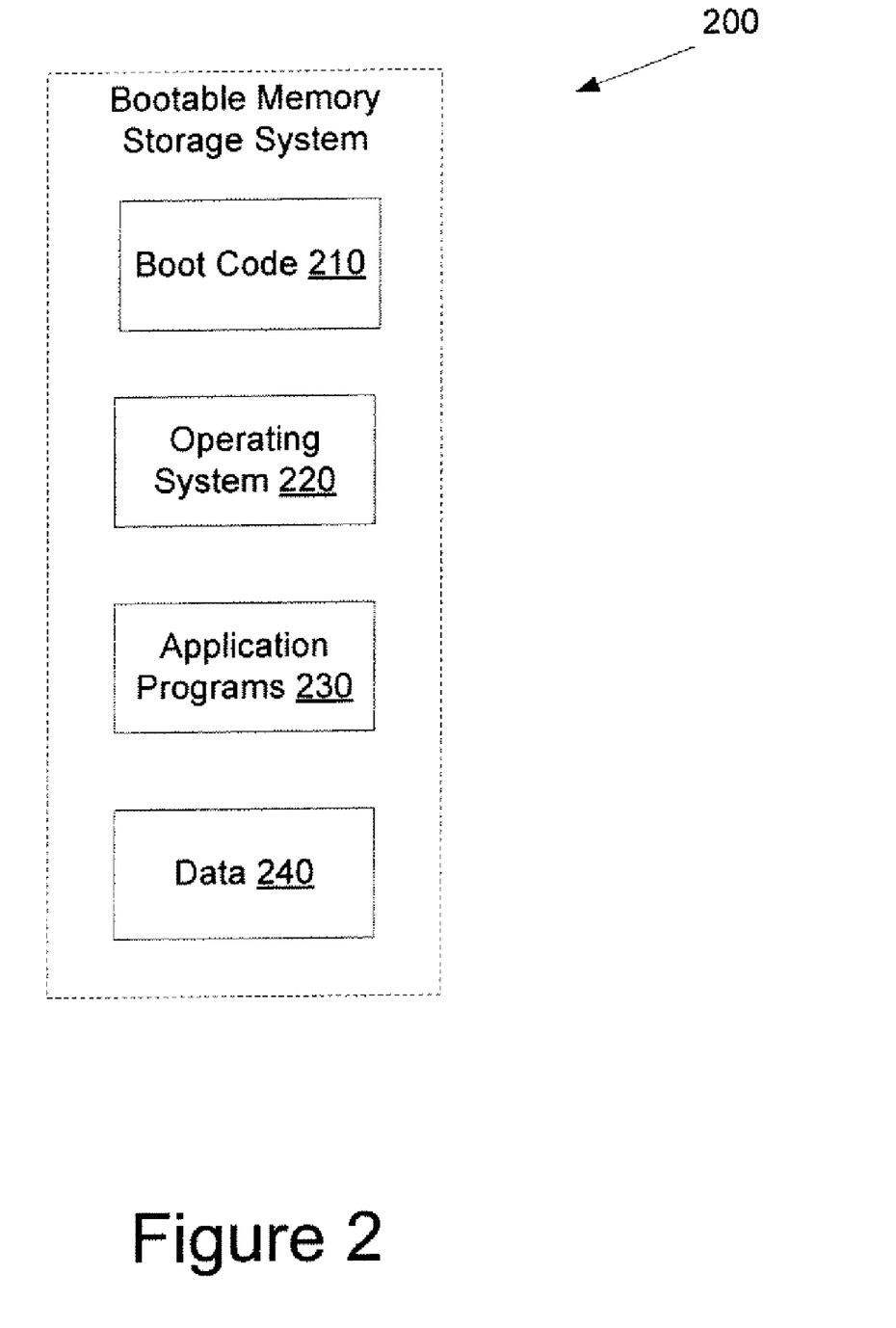
FIG. 2 is a schematic diagram illustrating a bootable memory storage device used for imaging a network monitor, in accordance with one embodiment of the present invention.

FIG. 2 is a schematic diagram illustrating one embodiment of a memory image for hosting a network monitor. Bootable memory storage 200 can be an ISO (International Organization for Standardization) image contained on a software carrier such as a CD or DVD. Bootable memory storage 200 can be booted by loading into bootable memory device such as a hard drive of a computing device designated as a network monitor. Bootable memory storage 200 can be divided into sections of reserved memory areas. The reserved memory areas can be demarcated as logical and/or physical partitions of a disk drive, memory banks, BLOBs (binary large objects) and the like.

Section 210 is reserved for use by a boot code routine, such as code contained within a boot sector of a hard drive. In various embodiments, a processor fetches a boot vector at boot time, which directs the processor program counter to execute a BIOS service to load the boot code routine from bootable memory storage 200 into a local (fast) memory. The boot code routine is executed by the processor to, for example, load an operating system, applications for network monitoring, and default data files used by the operating system and application programs. Previously existing information on the computing device to be used as a network monitor is normally overwritten (or deallocated).

Section 220 is reserved for storing the operating system code. The operating system is typically loaded into the processor local memory as described above, and executed after loading. Any portion of the operating system code can be combined with section 210, although typically the operating segment code remains segregated from the boot code routine.

Section 230 is reserved for storing application programs, such as monitoring services and support tools, and data for the network monitor. The application programs typically run under the direction of the operating system and require memory in bootable memory storage 200 for storing data that is used by the application programs. Any portion of section 230 can be combined with section 220.

Section 240 is a section of bootable memory storage 200 that is reserved for storing data and/or identification purposes. For example, section 240 can be used to store configuration and identification information, such as a token generated by the service provider server that generates the bootable image. In another example, section 240 can be used to store data used by the operating system and/or application programs.

Figure 3A:
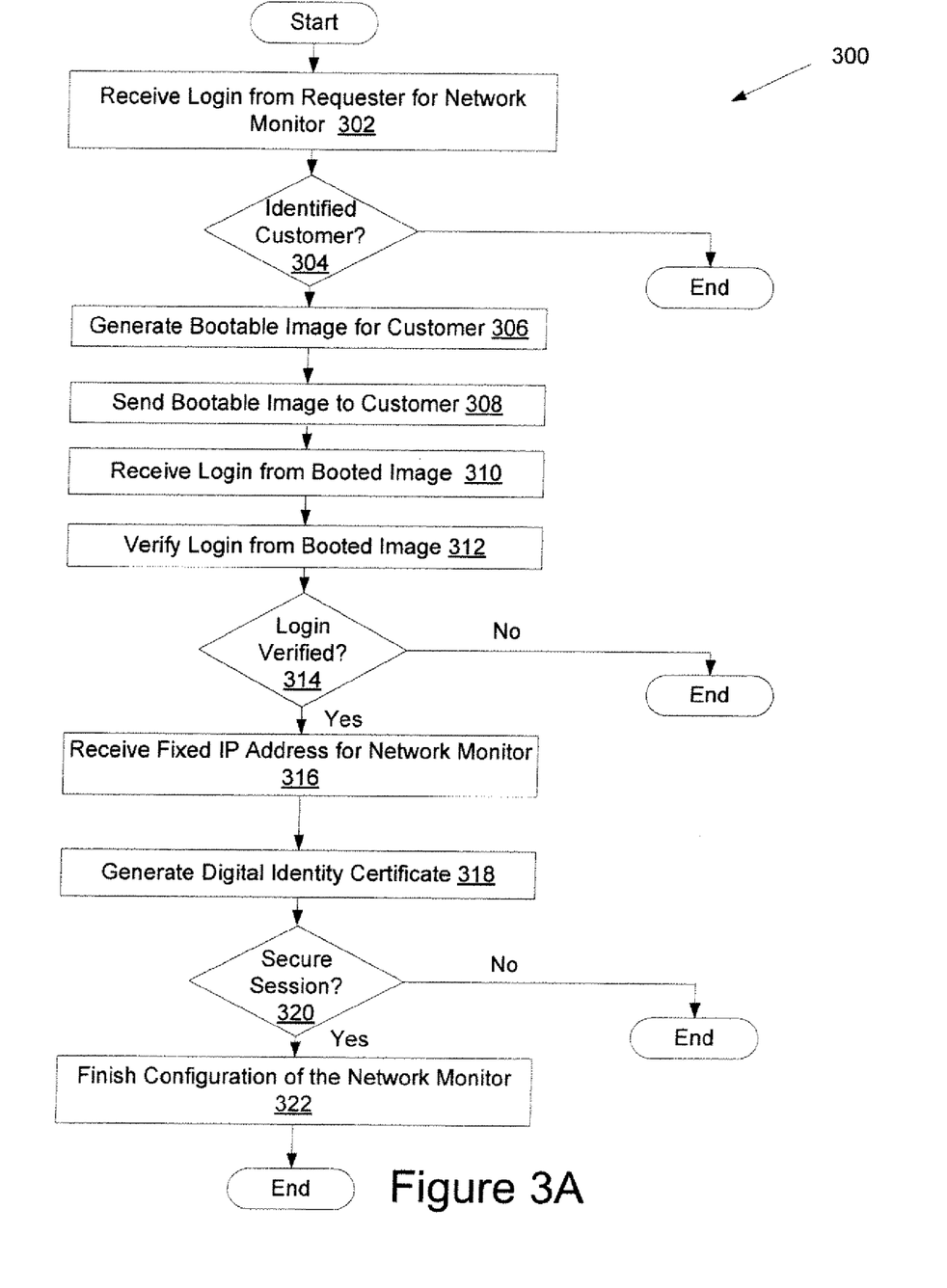
FIG. 3A is a flow diagram illustrating a server-side method for activating a network monitor using a network service provider server, in accordance with one embodiment of the present invention.

FIG. 3A is a flow diagram illustrating one embodiment of a server-based method 300 for imaging a network monitor. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a service provider server, such as service provider server 140 of FIG. 1B.

Referring to FIG. 3A, method 300 begins with processing logic of the service provider server receiving a requestor's login information and a request to download a bootable image for a network monitor (block 302). The request can be made from the computer that is to host the network monitor or from another computer. At block 304, processing logic determines whether the login belongs to a customer that is identified with a network for which monitoring services are to be rendered. The network can be arranged, for example, having one monitoring interface or two monitoring interfaces. The login name of the customer can be used to locate a stored description of the customer's network. Alternatively, the stored description can be generated by soliciting the logged-in user for a description of the network (and/or a link to a description of the network).

If the customer is not associated with a specified network, or if unacceptable credentials were provided, then the method ends. As discussed below, a certificate signing request and subsequent granting of a signed certificate can be used to authenticate customer communications. At block 306, the service provider server optionally selects or generates a bootable image to configure a network monitor. The bootable image can be selected on the basis of the most recent version, or selected (from a group of bootable images) using information from a network description that is associated with the logged in customer. The bootable image can also be made using the network description associated with the logged in customer. For example, the bootable image can contain a routine that ensures that each and every monitoring interface in the network description is configured properly. The bootable image can also contain data that specifies a level and type of service, types of (and frequency of) probes to used, length that probed data is to be maintained, payment information, and the like.

At block 308, the bootable image is sent to customer, such as by downloading an ISO image to the customer, or by loading the image onto a tangible medium that is physically sent to the customer. The customer can use the received bootable image to boot the system upon which the network monitor is to be executed. The booted system installs the image, executes from the image, and attempts to establish a connection with the service provider server.

At block 310, the service provider server receives a login attempt from the computer booting the image for a network monitor. The login can be accomplished by using the credentials presented in block 302, and/or can be accomplished by passing a token that was included in the downloaded bootable image, for example.

At block 312, the login is verified by comparing the received information with stored information. The stored information can be a username/password combination and/or the token that was generated in block 306. At block 314, the method ends if the login is not verified. If the login is verified, the method proceeds to block 316.

At block 316, the service provider server receives a fixed IP address of the network monitor. For example, when the user logs in, the user may "click on" a displayed "provision a new network monitor" link. The user can be prompted to provide a local fixed IP address for the network monitor. The fixed IP address is associated with the network monitor that is described in the network description so that the service provider server can use the fixed IP address to communicate with the network monitor. The user can activate a "submit" button on the user interface, which can cause a redirection of the user interface from the service provider server to the network monitor itself. The redirection information sent to the network monitor can include an account ID of the user, cluster, satellite, and network monitor identification, and a transaction ID.

At block 318, a digital identity certificate is generated. For example, the network monitor may receive redirection information (including identifying information such as the account ID of the user, cluster, satellite, and network monitor identification, and a transaction ID). In response to the redirection, the network monitor can generate public and private keys, and generate a certificate signing request that is sent (along with the transaction ID) to the service provider server for certification. The service provider server can act as a certificate authority, or forward the request to the certificate authority to obtain the digital identity certificate (which is sent to the network monitor). Alternatively, the service provider server can generate public and private keys for the network monitor, generate the digital identity certificate, and forward the digital identity certificate to the network monitor. The service provider server can validate the certificate signing request by comparing the transaction ID with the account ID of the user, cluster and network monitor identification, and a transaction ID embedded in the request. If the account ID of the user, cluster and network monitor identification, and a transaction ID embedded in the request match information in the certificate signing request, the service provider server can sign the request and return a signed digital identity certificate to the network monitor. The network monitor can install the signed digital identity certificate, which can be presented to the service provider server to establish secure sessions. Secure sessions between the service provider server and the network monitor can be established by using the signed digital identity certificate. The service provider server can use the signed digital identity certificate to "map" (e.g., associate) each transaction with the network monitor associated with the signed digital identity certificate.

At block 320, processing logic determines whether a secure session has been established with the network monitor. If a secure session has been established, then the method proceeds to block 322. If no credentials were provided, or if unacceptable credentials were provided, then the method ends.

At block 332, the service provider server finishes configuring the network monitor. The network monitor can be configured to various degrees in the install image, and further configured as needed after the installation has been successfully completed. Various network monitors can be downloaded and installed in the same network, and even installed in the same platform hosting the network monitor when a virtual machine is used as a platform.

Figure 3B:
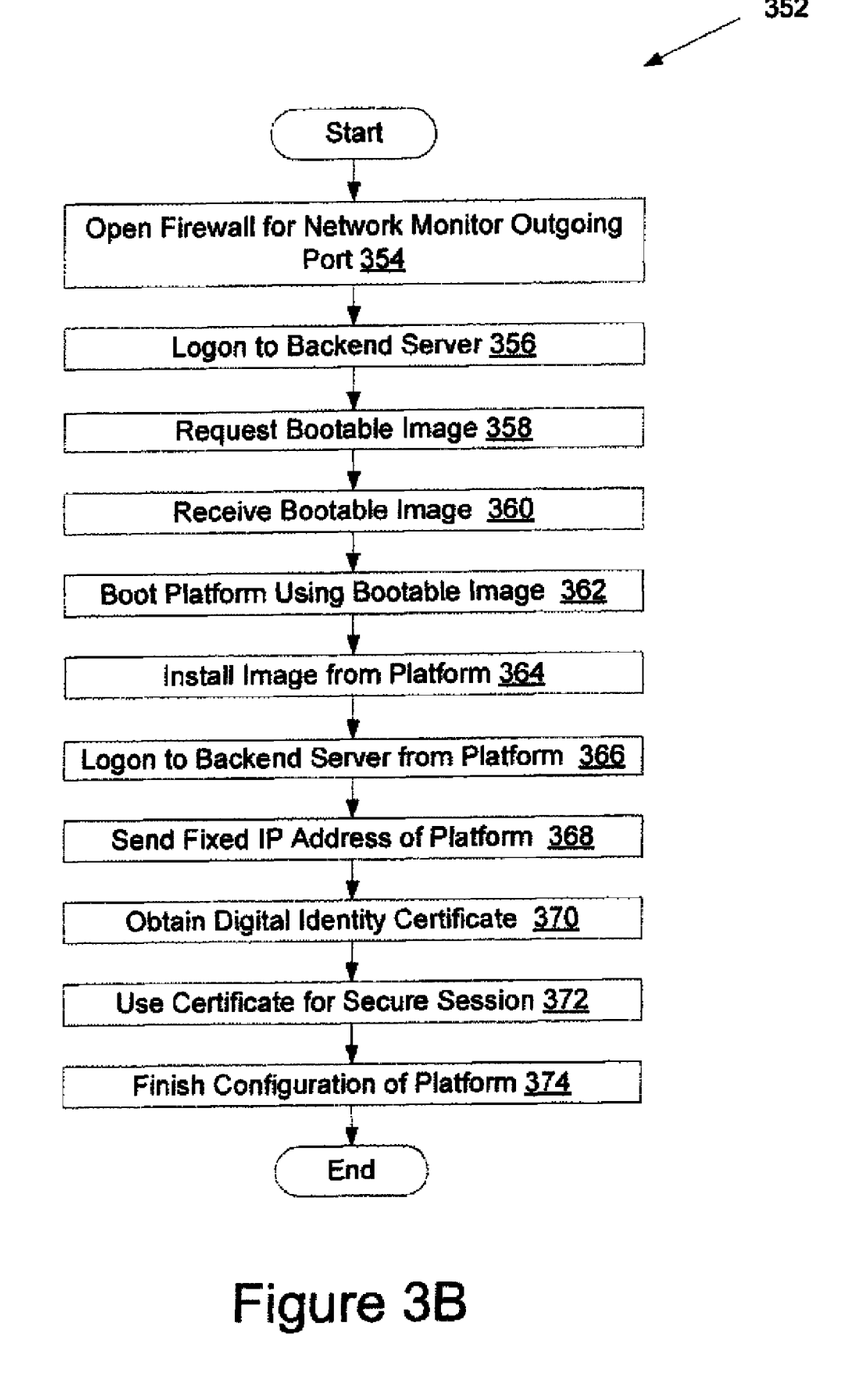
FIG. 3B is a flow diagram illustrating a client-side method for activating a network monitor, in accordance with one embodiment of the present invention.

FIG. 3B is a flow diagram illustrating one embodiment of a client-based method 352 for installation of a software network monitor. The method may be performed by processing logic (that can be executed by the computer hosting the network monitor) that may comprise hardware (e.g., circuitry, dedicated logic, programmable logic, microcode, etc.), software (e.g., instructions run on a processing device to perform hardware simulation), or a combination thereof. In one embodiment, the method 352 is performed by devices on the customer network, such as the client 120 and the device 154 of FIG. 1A.

Referring to FIG. 3B, method 352 begins with editing, based on user input, the firewall configuration of the customer network to allow outbound traffic over port 443 for the network monitor (block 354). The firewall information may include specific fixed IP addresses for the service provider server so that the service provider server can receive communications from the network monitor when booted. The specific fixed IP address can also be used to identify a particular organization for which the service provider server is to provide network monitoring services. At block 356, the user logs on to the service provider server, where the service provider server uses the user credentials to (among other possible uses) identify a network configuration of a network to be monitored using a network monitor.

At block 358, processing logic sends a user request to the service provider server to obtain a bootable image for a network monitor to be installed. The user, for example, can click on a download tab on a user interface screen generated by the service provider server and displayed on the client device of the user making the request. At block 360, a bootable image is received via a software carrier medium or downloading and copying to a bootable medium.

The installation process will now be discussed in more detail with reference to FIG. 3B and FIGS. 4A through 4D illustrating exemplary user interface screens generated during the installation process in accordance with one embodiment of the invention.

Figure 4A:
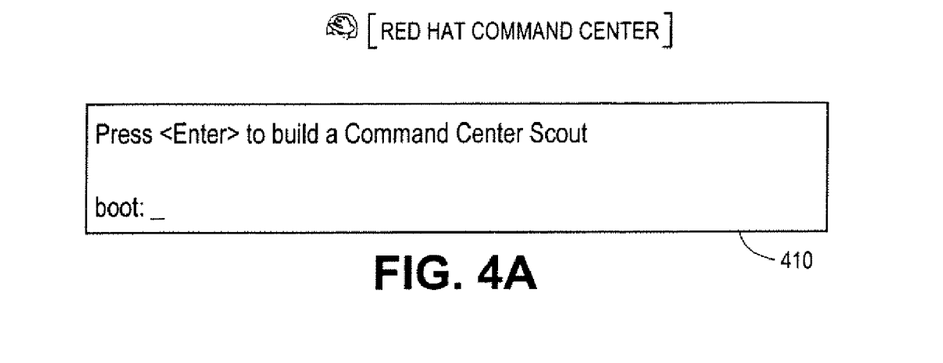
FIGS. 4A-4D are exemplary user interfaces facilitating user input during installation of a network monitor, in accordance with one embodiment of the present invention.

At block 362, processing logic receives a user request to boot a platform in which to install the network monitor and boots the platform from the bootable medium. The install script may generate and display an exemplary user interface screen 410 for controlling the boot process, as shown in FIG. 4A.

Figure 4B:
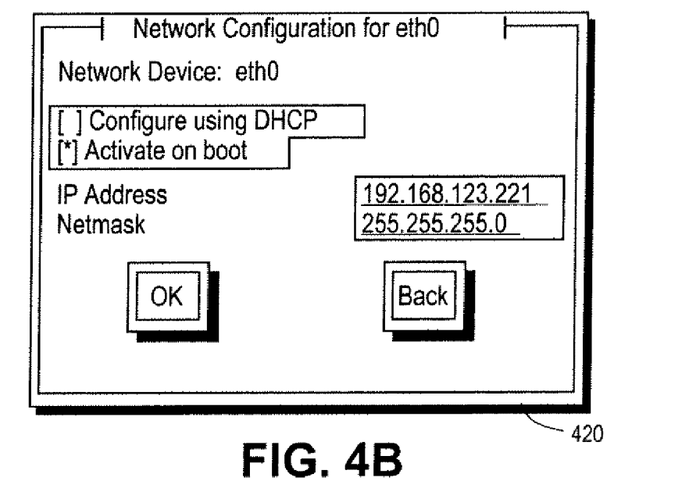
Figure 4C:
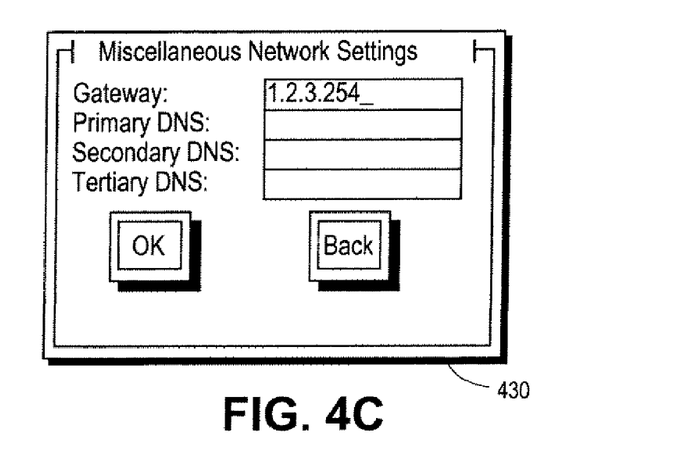
Figure 4D:
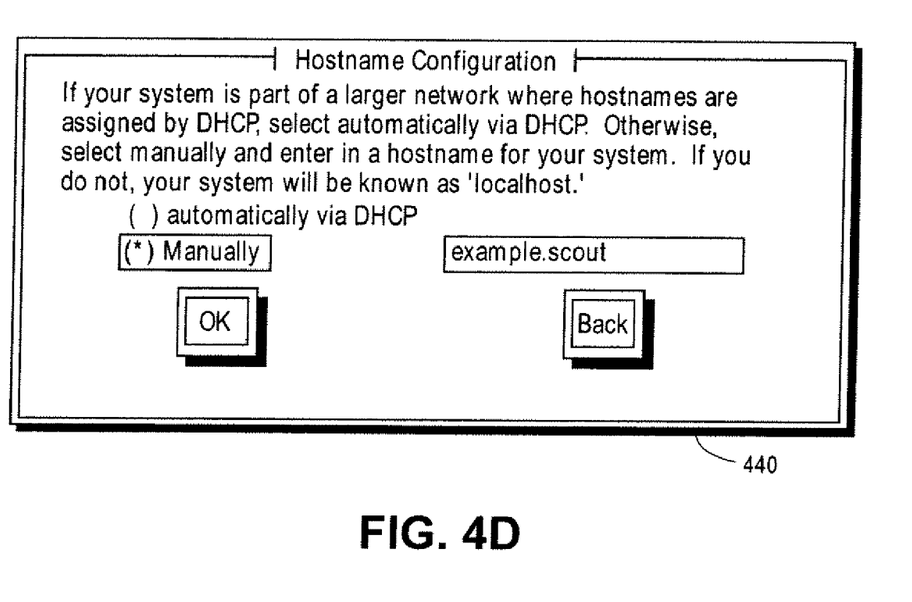

At block 364, the boot program runs an install script that installs both an operating system and application software for the network monitor. The script can be used to install multiple interfaces, such as for "eth0" and "eth1." The install script may generate and display an exemplary user interface screen 420 (as shown in FIG. 4B) for prompting the user to supply net-masks and IP addresses for the network monitor. The install script may also generate and display an exemplary user interface screen 430 (as shown in FIG. 4C) for receiving IP addresses for the primary, secondary, and tertiary domain name servers. The network monitor is given a host name and configured using a fixed IP address. For example, the install script may generate and display a user interface screen 440 (as shown in FIG. 4D) for receiving a host name from a user. Multiple interfaces are normally given separate host names. For complex customer networks, the user can configure off-net routes and additional IP addresses using, for example, a web-based interface after the network monitor has been provisioned. The install script can cause a redirection of the user interface from the service provider server to the network monitor itself. The redirection information can include an account ID of the user, cluster and network monitor identification, and a transaction ID. The network monitor may receive redirection information and generate a certificate signing request that is sent to the service provider server for certification. The service provider server can validate the certificate signing request as described above with respect to block 318, for example. The network monitor can install the signed digital identity certificate, which can be presented to the service provider server to establish secure sessions.

At block 366, the rebooted platform logs on to the service provider server using, for example, the signed digital identity certificate supplied in block 364 and/or by returning a token contained in the downloaded (or mailed) boot image.

At block 368, the platform sends the fixed IP address of the network monitor to the service provider server. The service provider server uses the fixed IP address to provision the network monitor. For example, a portal in the service provider server can be opened to provision the network monitor. The service provider server can associate the received fixed IP address with a network monitor in the stored network description (by comparing a supplied host name to host names in the stored network description, for example).

At block 370, a digital identity certificate is obtained. For example, the service provider server can open a web-based administrator for the network monitor that automatically (and securely) generates public and private keys. The keys can be used to establish a secure session, as in block 372. In block 374, the user can use the secure session to finish configuration of the platform hosting the network monitor as well as to initiate the network monitoring services. Alternatively, the network monitoring services can begin automatically upon obtaining the cryptographic keys.

Figure 5:
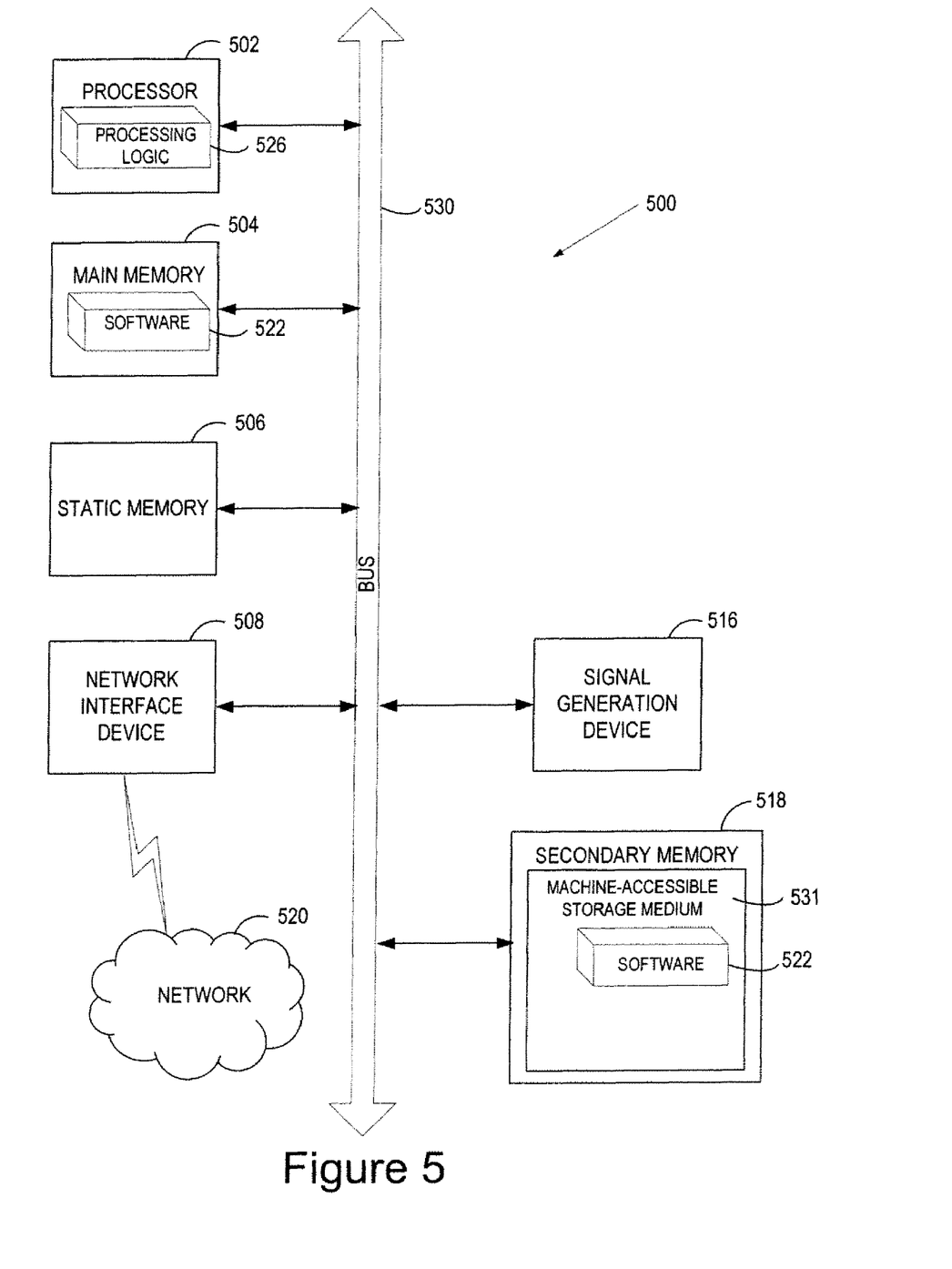
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. The machine may be connected (e.g., networked) to other machines in a LAN, an intranet, an extranet, or the Internet. The machine may operate in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The machine may be a server, a personal computer, a mobile device, or any other device and may represent, for example, a front end server 115 156, a service provider server 140, a client 129, a network monitor 154, or any other computing device.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), and a static memory 506 (e.g., flash memory, static random access memory (SRAM), etc.), which may communicate with each other via a bus 530. Alternatively, the processing device 502 may be connected to memory 504 and/or 506 directly or via some other connectivity means.

Processing device 502 represents one or more general-purpose processing devices such as a microprocessor, central processing unit, or the like. More particularly, the processing device 502 may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 502 is configured to execute processing logic 526 for performing the operations and steps discussed herein.

The computer system 500 may further include a network interface device 508 and/or a signal generation device 516. It also may or may not include a video display unit (e.g., a liquid crystal display (LCD) or a cathode ray tube (CRT)), an alphanumeric input device (e.g., a keyboard), and/or a cursor control device (e.g., a mouse).

The computer system 500 may or may not include a secondary memory 518 (e.g., a data storage device) having a machine-accessible storage medium 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

While the machine-accessible storage medium 531 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method, comprising:
selecting a bootable image for a network monitor for monitoring a customer network, the bootable image including network monitoring software and an operating system;
providing, by a service provider server, the bootable image to a requestor, wherein the bootable image is to be installed on a computing device of the customer network, the bootable image including instructions to cause a certificate signing request to be generated for the network monitor;
receiving the generated certificate signing request;
validating the received certificate signing request;
in response to successfully validating the received certificate signing request, requesting, by the service provider server, a fixed IP address of the network monitor on the computing device of the customer network; and
receiving, by the service provider server, the fixed IP address of the network monitor having the bootable image installed thereon.

2. The method of claim 1 wherein network requirements for the computing device used to host the network monitor are limited to having an established secure connection with a communications network.

3. The method of claim 1 wherein the selected bootable image is generated using network information received from the requestor.

4. The method of claim 1 wherein an installation of the bootable image on the computing devices causes an existing operating system and data of the computing device to be overwritten.

5. The method of claim 1 wherein:
the requestor is a client computer that is different from the computing device used to host the network monitor; and
the bootable image is provided to the client computer in response to a request of the client computer for the bootable image of the network monitor.

6. The method of claim 1 wherein the bootable image includes instructions to request an IP address of a gateway for the customer network, an IP address of a DNS server of the customer network, and a hostname of the network monitor, when the bootable image is being installed on the computing device used to host the network monitor.

7. A computer implemented method, comprising:
providing, to a service provider server, information concerning a customer network to be monitored;
receiving, from the service provider server, a bootable image that includes network monitoring software and an operating system, wherein the bootable image has been selected for installation on a computing device of the customer network using the provided network information;
installing the received bootable image on a computing device designated to host the network monitor;
generating a certificate signing request in response to the installation of the received bootable image;
sending the certificate signing request to the service provider server, wherein the certificate signing request is associated with transaction identifier that is known to the service provider server;
receiving a signed digital identity certificate in response to the service provider server validating the sent certificate signing request;
obtaining a fixed IP address of the network monitor on the computing device of the customer network during the installation of the bootable image; and
providing the fixed IP address of the network monitor to the service provider server using the signed digital identity certificate to establish a secure session in which the fixed IP address is provided.

8. The method of claim 7, further comprising:
sending a request for the bootable image to the service provider server.

9. The method of claim 7 wherein the network monitoring software comprises monitoring services and support tools.

10. The method of claim 7 further comprising:
overwriting an existing operating system and data of the computing device used for the network monitor during the installation of the bootable image.

11. The method of claim 7 wherein the network information is provided to the service provider server, and the bootable image is received from the service provider server, by a client computer that is different from the computing device designated to host the network monitor.

12. The method of claim 7 further comprising:
obtaining, during the installation of the bootable image, an IP address of a gateway for the customer network, an IP address of a DNS server of the customer network, and a hostname of the network monitor.

13. The method of claim 7 further comprising:
sending identification information identifying the customer network to the service provider server when sending the certificate signing request to the service provider server.

14. A non-transitory machine-accessible storage medium including instructions that, when executed by a first machine, cause the first machine to perform a computer implemented method comprising:
receiving network information concerning a customer network to be monitored by a network monitor;
selecting a bootable image for the network monitor, the bootable image including network monitoring software and an operating system, wherein the bootable image is selected using the network information;
providing, by a service provider server, the bootable image to a requestor, wherein the bootable image is to be installed on any computing device of the customer network, the bootable image including instructions to securely request, by the service provider server, a fixed IP address of the network monitor when the bootable image is being installed on a computing device of the customer network that is designated to host the network monitor; and receiving, by the service provider server, the fixed IP address of the network monitor from the designated computing device having the bootable image installed thereon.

15. The non-transitory machine-accessible storage medium of claim 14 wherein the bootable image contains instructions to generate a certificate signing request and to use a signed digital identity certificate generated in response to validating the certificate signing request to securely request the fixed IP address of the network monitor.

16. The non-transitory machine-accessible storage medium of claim 14 wherein the network monitoring software comprises monitoring services and support tools.

17. The non-transitory machine-accessible storage medium of claim 14 wherein an installation of the bootable image on the designated computing devices causes an existing operating system and data of the designated computing device to be overwritten.

18. The non-transitory machine-accessible storage medium of claim 14 wherein:
the requestor is a client computer that is different from the computing device designated to host the network monitor; and
the bootable image is provided to the client computer in response to a request of the client computer for the bootable image of the network monitor.

19. The non-transitory machine-accessible storage medium of claim 14 wherein the bootable image includes instructions to request an IP address of a gateway for the customer network, an IP address of a DNS server of the customer network, and a hostname of the network monitor, when the bootable image is being installed on the computing device designated to host the network monitor.

20. A system, comprising:
a monitor image generator, executable by a processing device of a service provider server, to receive network information concerning a customer network to be monitored by a network monitor, to generate a bootable image for the network monitor, the bootable image including network monitoring software and an operating system, wherein the bootable image is generated using the provided configuration information, and to provide the bootable image to a requestor, wherein the bootable image is to be installed on any computing device of the customer network, the bootable image including instructions to cause the service provider server to request a fixed IP address of the network monitor when the bootable image is being installed on a computing device of the customer network that is designated to host the network monitor; and
an install and provisioning manager, executable by the processing device and coupled to the monitor image generator, to cause the service provider server to receive the fixed IP address of the network monitor from the designated computing device having the bootable image installed thereon.

21. The system of claim 20 wherein the bootable image contains instructions to generate a certificate signing request and to use a signed digital identity certificate generated in response to validating the certificate signing request to securely request the fixed IP address of the network monitor.

22. The system of claim 20 wherein the network monitoring software comprises monitoring services and support tools.

23. The system of claim 20 wherein an installation of the bootable image on the designated computing devices causes an existing operating system and data of the designated computing device to be overwritten.

24. The system of claim 20 wherein:
the requestor is a client computer that is different from the computing device designated to host the network monitor; and
the bootable image is provided to the client computer in response to a request of the client computer for the bootable image of the network monitor.

25. The system of claim 20 wherein the bootable image includes instructions to request an IP address of a gateway for the customer network, an IP address of a DNS server of the customer network, and a hostname of the network monitor, when the bootable image is being installed on the computing device designated to host the network monitor.

* * * * *